United States Patent
Murasawa et al.

(10) Patent No.: US 7,720,138 B2
(45) Date of Patent: May 18, 2010

(54) COMMUNICATION SYSTEM

(75) Inventors: Manabu Murasawa, Kawasaki (JP); Seisuke Aoki, Kawasaki (JP); Ikuo Hiraishi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 798 days.

(21) Appl. No.: 11/131,322

(22) Filed: May 18, 2005

(65) Prior Publication Data
US 2005/0278608 A1 Dec. 15, 2005

(30) Foreign Application Priority Data
May 21, 2004 (JP) .............................. 2004-151247

(51) Int. Cl.
*H04B 3/46* (2006.01)
(52) U.S. Cl. ........................ 375/225; 375/231; 714/776; 702/79
(58) Field of Classification Search ................. 375/225, 375/231; 714/776; 702/79
See application file for complete search history.

(56) References Cited
U.S. PATENT DOCUMENTS 4,761,800 A * 8/1988 Lese et al. .................. 375/370
4,769,761 A * 9/1988 Downes et al. .............. 709/224
5,790,572 A * 8/1998 Oguro et al. ................ 714/798
2004/0190473 A1* 9/2004 Ha et al. ..................... 370/332

OTHER PUBLICATIONS

Patent Abstracts of Japan, Publication No. 02-009251, Published Jan. 12, 1990.
Patent Abstracts of Japan, Publication No. 07-170253, Published Jul. 4, 1995.

* cited by examiner

*Primary Examiner*—Shuwang Liu
*Assistant Examiner*—Michael R Neff
(74) *Attorney, Agent, or Firm*—Fujitsu Patent Center

(57) ABSTRACT

A communication system is provided which is capable of easily setting a transmission speed between a signal transmitter and a signal receiver to carry out information communication. A transmitting device transmits one frame of measuring data which contains a start bit to be added to a head of the data and a stop bit to be added to an end of the data and which is used for a signal receiver to measure a transmission speed. A framing error detector in a receiving device receives the measuring data for detection, at every measuring point, of a framing error which occurs when a transmission speed of the signal transmitter does not coincide with a transmission speed of the signal receiver and normal detection of a stop bit is impossible and generates information about detection of a framing error. A transmission speed measurer measures a transmission speed of the transmitting device based on information about detection of a framing error and measuring point interval time.

5 Claims, 7 Drawing Sheets

COMMUNICATION SYSTEM

CROSS-REFERENCE TO RELATED APPLICATIONS

This application is based upon and claims the benefits of priority from the prior Japanese Patent Application No. 2004-151247, filed on May 21, 2004, the entire contents of which is incorporated herein by reference.

BACKGROUND OF THE INVENTION

1. Field of the Invention

The present invention relates to a communication system, and particularly to a communication system which carries out communication by setting a transmission speed.

2. Description of the Related Art

In order to transfer information in computer devices being connected via a network or the like, serial communication is widely used. Serial communication method is a method in which a signal transmitter transmits one bit of digital data of 0s and 1s at one time at regular intervals in a sequentially repeated manner to a signal receiver and the signal receiver restores the received data to its original state. A synchronization method for serial communication includes a synchronous communication method and an asynchronous (start-stop synchronization) communication method. In the synchronous communication method, a signal transmitter transmits a clock in addition to data to a signal receiver and the signal receiver reads out the received data with timing of receiving the clock for synchronization. In the asynchronous communication method, a signal transmitter does not transmit a clock to be used for synchronization but adds a start bit representing a start of data transmission to a head of data and a stop bit representing completion of the data transmission to an end of the data and the signal receiver recognizes a data interval from the start bit and stop bit and reads out the data for synchronization. Data transmission speed in the asynchronous communication method is low when compared with a transmission speed in the synchronous communication due to the step of addition of a start bit and a stop bit. However, the asynchronous communication method is excellent in scalability and/or availability and, therefore, is mainly used in general personal computer communication.

Moreover, when asynchronous communication is carried out between two communication devices, matching for a transmission speed between the two devices is required. Transmission speed denotes the number of bits that can be transmitted in one second and is expressed as bps (bit/second). FIG. 7 shows a conventional method for setting a transmission speed.

(Step S11) A communication device 30 transmits data to a communication device 40 at a transmission speed set by the communication device 30 itself.

(Step S12) The communication device 40 checks to see whether or not the transmission speed set by the communication device 30 is equal to a transmission speed set by the communication device 40.

(Step S13) The communication device 40, when the transmission speed set by the communication device 40 is different from the transmission speed set by the communication device 30, transmits a signal informing occurrence of an error to the communication device 30.

(Step S14) The communication device 30 transmits data at another transmission speed set by the communication device 30 to the communication device 40. The above steps S11 to S14 are repeated until matching for the transmission speed between the communication devices 30 and 40 is achieved.

(Step S15) The communication between the devices 30 and 40 is started when matching for the transmission speed between the devices 30 and 40 is achieved.

A conventional asynchronous communication technology is disclosed in, for example, Japanese Unexamined Patent Application No. Hei 7-170253 [see Paragraph number (0007) to (0009), FIG. 1] in which, when incorrect synchronization occurs, a signal receiver makes a framing error signal be generated to detect the incorrect synchronization and achieves correct synchronization when receiving a subsequent frame. However, the conventional method for setting a communication speed as shown in FIG. 7 has a problem in that both the two communication devices continue to exchange information about a transmission speed until both the two devices come to have the same set transmission speed, which, as a result, causes a transmission speed value that can be set to be limited to a certain predetermined value.

Moreover, the aim of the conventional technology disclosed in Japanese Patent Application Laid-open No. Hei 07-170253 is to restore normal synchronization when a transmitting device and a receiving device go out of synchronization with one another and incorrect synchronization occurs in a state where matching for a transmission speed between the transmitting and receiving devices is established in advance and is not to intend to do automatical setting of a transmission speed.

SUMMARY OF THE INVENTION

In view of the foregoing, it is an object of the present invention to provide a communication system which is capable of setting a transmission speed in an easy and effective manner to carry out information communication.

To accomplish the above object, according to the present invention, there is provided a communication system for carrying out communication by setting a transmission speed, comprising:

a transmitting device to transmit one frame of measuring data which contains a start bit to be added to a head of the data and a stop bit to be added to an end of the data and which is used for a signal receiver to measure a transmission speed; and a receiving device having a framing error detector to receive the measuring data for detection, at every measuring point, of a framing error which occurs when a transmission speed of a signal transmitter does not coincide with a transmission speed of the signal receiver and normal detection of a stop bit is impossible and to generate information about detection of a framing error and having a transmission speed measurer to measure a transmission speed of the transmitting device based on information about detection of a framing error and measuring point interval time.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

Figure 1:
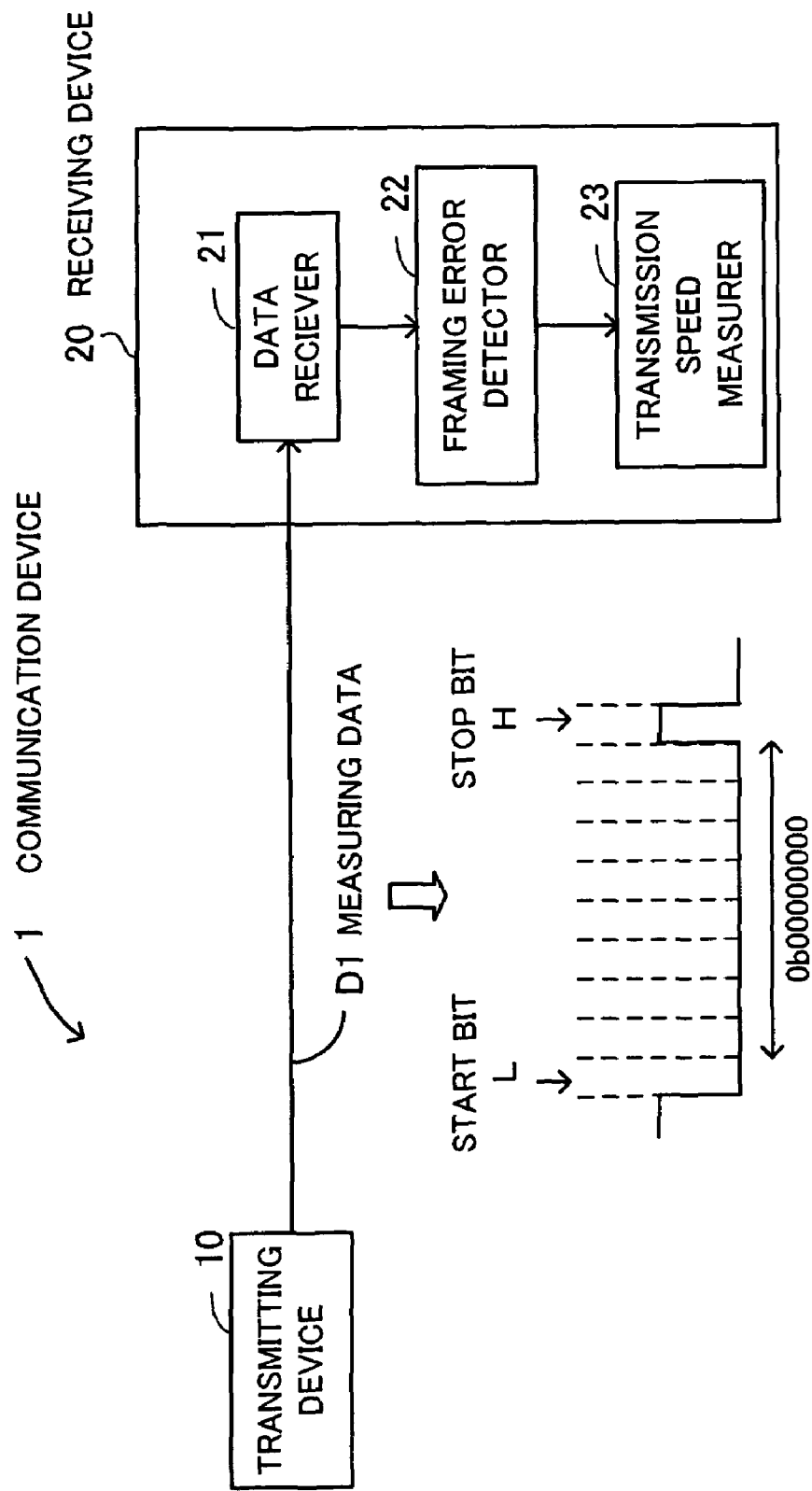
FIG. 1 shows operating principles of the communication system of the present invention.

Hereinafter, embodiments of the present invention are described by referring to drawings. FIG. 1 shows operating principles of a communication system of the present invention. The communication system 1 of the present invention includes a transmitting device 10 and a receiving device 20 which carries out an asynchronous communication by setting a transmission speed.

The transmitting device 10 transmits one frame of measuring data D1 which contains a start bit to be added to a head of the data and a stop bit to be added to an end of the data and which is used for measuring a transmission speed. As concrete data for the measurement, a total of 10 bits of data including low-level 8 bits of data, a low-level one start bit to be added to a head of the data and a high-level one stop bit to be added to an end of the data.

The receiving device (communication device) 20 is made up of a data receiver 21, a framing error detector 22, and a transmission speed measurer 23. The data receiver 21 receives measuring data D1 fed from the transmitting device 10. The framing error detector 22 detects, by receiving measuring data D1 and at every measuring point, a framing error occurring when a transmission speed of a signal transmitter does not coincide with a transmission speed of a signal receiver and a stop bit is not be normally detected and generates information about the detection of a framing error. The transmission speed measurer 23 measures a transmission speed of the transmitting device 10 according to framing error detecting information and measuring point interval time. After a transmission speed has been measured, data communication between the transmitting device 10 and receiving device 20 is carried out at the transmission speed obtained by the measurement. Details on operations of the communication system of the present invention are descried by referring to FIG. 4 and later.

Here, the transmission speed is described. A transmission speed can be expressed not only by a unit of bps but also by a unit of a baud. The unit of bps represents the number of bits that can be transferred in one second. On the other hand, the baud represents a unit of a speed of serial data transfer in a modem or the like and originally denotes the number of times of timing for switching a signal (modified signal) state. Both the bps and baud are a unit to represent a transmission speed and vary depending on communication environments. For example, in a modem providing a transmission speed being as low as 1200 bps, its baud rate coincides with its bps. However, in a modem having a transmission speed of 2400 bps, one signal is provided with 2 bits of information by using four phase modulation method and, as a result, the 2400 bps being expressed by the unit of a baud is equal to 1200 baud (therefore, it is preferable to use the unit of bps when a transmission speed is applied generally to communication devices). Hereinafter, in the description of the present invention, the transmission speed is expressed by the unit of bps.

Figure 2:
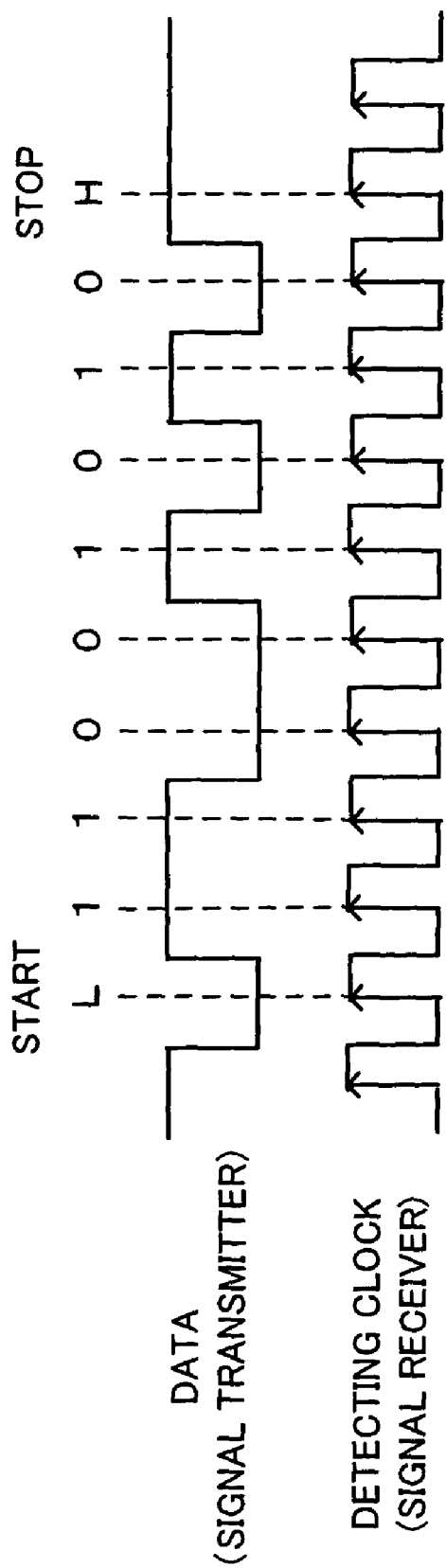
FIG. 2 shows a UART (Universal Asynchronous Receiver Transmitter) asynchronous data transfer format employed in the present invention.

Next, an asynchronous data transfer format in UART (Universal Asynchronous Receiver Transmitter) and a framing error are described. FIG. 2 shows a UART asynchronous data transfer format employed in the present invention. The UART is an LSI (Large-Scale Integrated) circuit to be used for asynchronous transmission and a personal computer generally uses a UART chip to carry out asynchronous communication.

In the asynchronous transmission, transmission is accomplished in units of characters and, for example, a signal transmitter transmits 5-bit to 8-bit characters with a start bit and a stop bit being added to the characters and a signal receiver detects each bit according to detecting clocks to read the characters. FIG. 2 shows a transfer format of an 8-bit (11001010) character with a low-level start bit being added, without fail, immediately before a first bit making up the 8-bit characters and with a high-level stop bit being added, without fail, immediately after a last bit making up the 8-bit characters (hereinafter, the character in the description is called "data").

Figure 3:
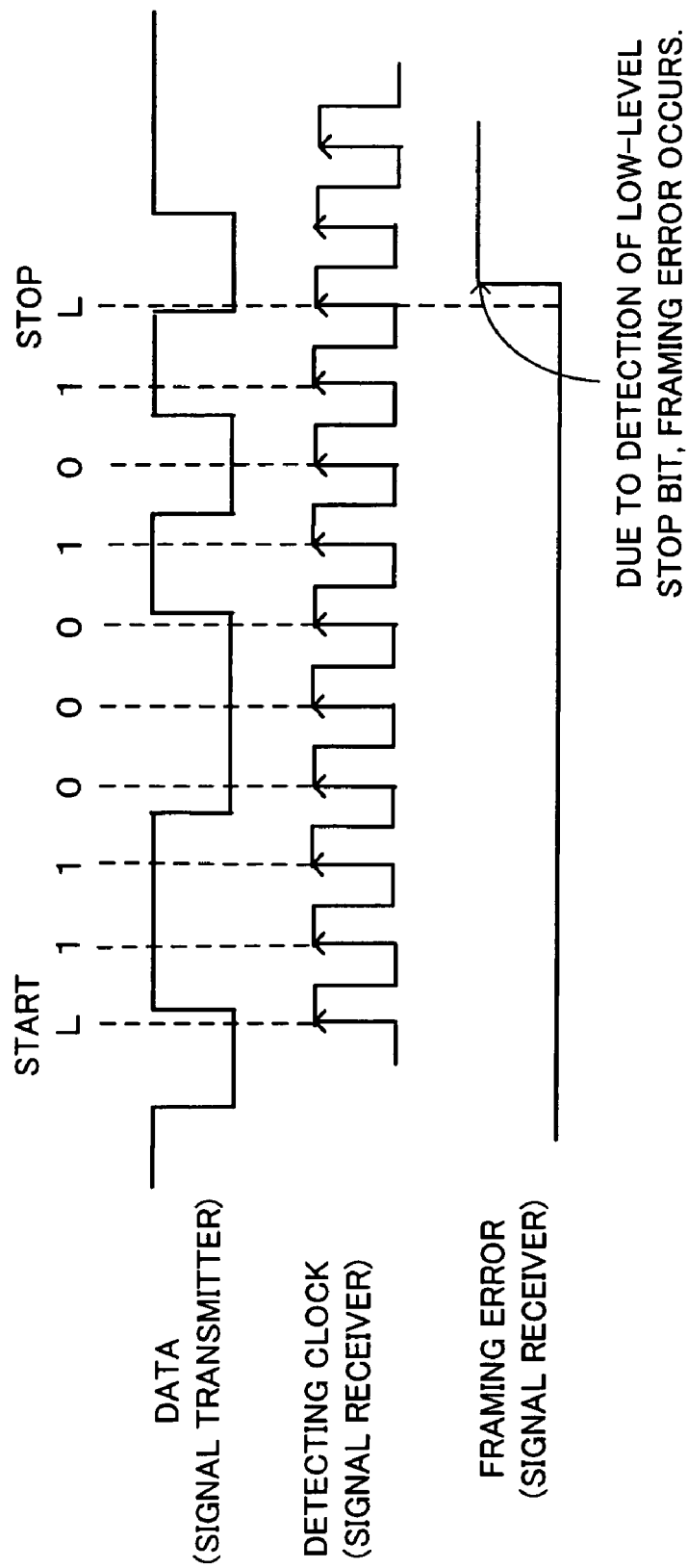
FIG. 3 shows an example of a framing error having occurred in the transfer format of FIG. 2.

FIG. 3 shows a framing error occurring in the transfer format shown in FIG. 2. The framing error occurs when a detected stop bit is at a high level in a state in which a transmission speed of a signal transmitter does not coincide with a transmission speed of a signal receiver (that is, when one bit interval of data transmitted from the signal transmitter is different from one bit interval of a detecting clock received by the signal receiver).

In FIG. 3, since the transmission speed of the signal transmitter does not coincide with the transmission speed of the signal receiver, though the detected stop bit should be originally at a high level, the detected stop bit is at a low level, which shows occurrence of a framing error (in the example shown in FIG. 3, when the framing error occurs, the framing error signal is at a high level).

Figure 4:
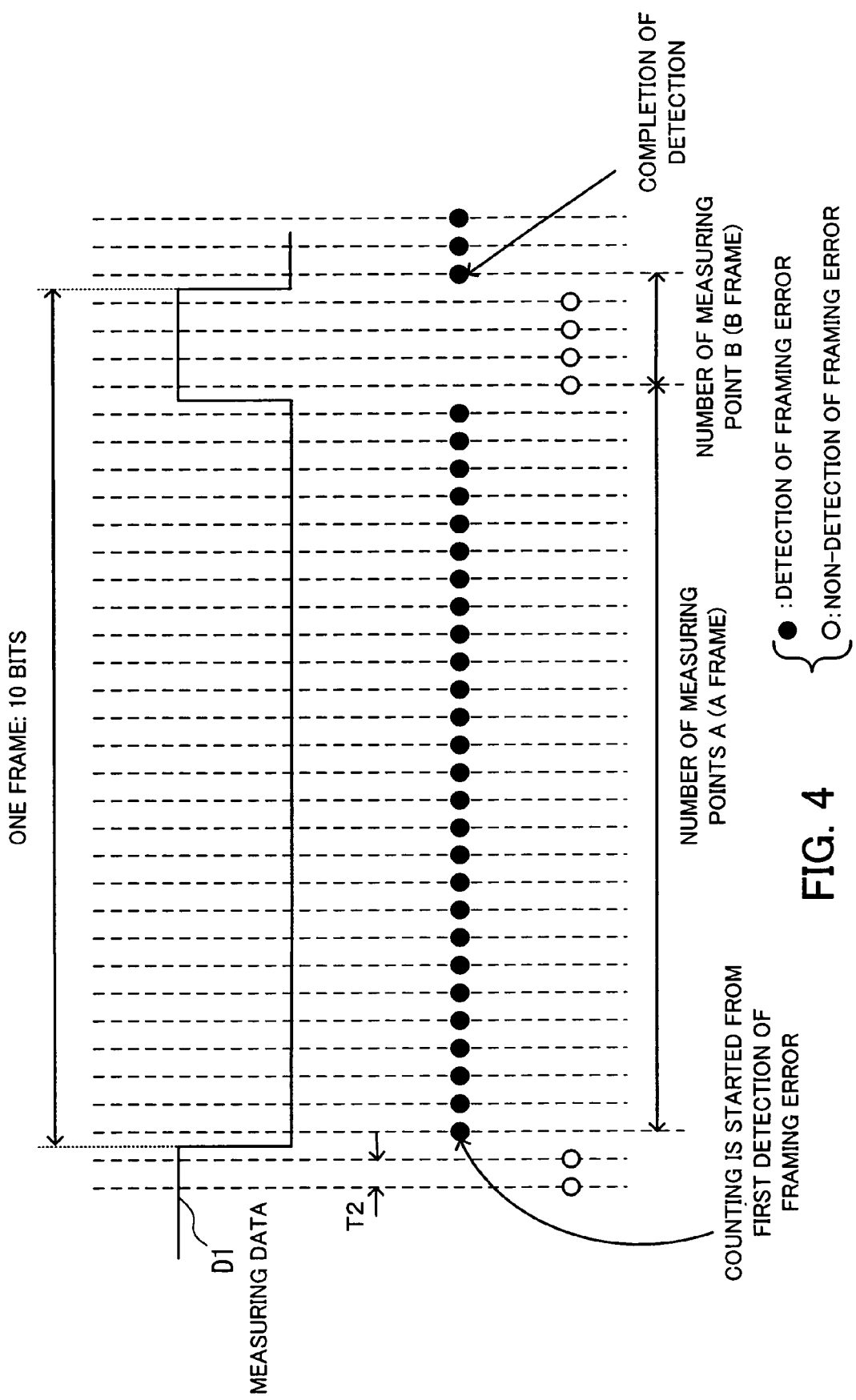
FIG. 4 shows a diagram to explain the calculation of a transmission speed employed in the present invention.

Next, calculation of a transmission speed of the present invention is described in detail. FIG. 4 shows a diagram to explain the calculation of a transmission speed employed in the present invention. FIG. 4 shows that the transmission speed of the transmitting device 10<the transmission speed of the receiving device 20, illustrating a state before setting of transmission speed. The measuring data D1 to be transmitted from the transmitting device 10 and to be used for setting a transmission speed is made up of one frame having a total of 10 bits including low-level 8 bits of data, a low-level one start bit to be added to a head of the data and a high-level one stop bit to be added to an end of the data. While a transmission speed is being calculated, the measuring data D1 continues to be transmitted.

In FIG. 4, "T1[s]" denotes time of one frame (the T1 is unknown to the receiving device 20 at an initial stage). Moreover, an interval among dotted lines shown in FIG. 4 is equivalent to 10 clocks to be fed to the receiving device 20 to which "T2[s]" is assigned (the T2 is naturally known to the receiving device 20).

The framing error detector 22 in the receiving device 20, when receiving the measuring data D1, performs processing of detecting a framing error. As described above, a framing error occurs when a detected stop bit is at a low level and, therefore, in the example, if a level of the measuring data corresponding to a 10th clock (bit position where a stop bit exists) received by the receiving device is low, occurrence of a framing error is detected. That is, a level of the measuring data D1 is detected at every 10 clocks and, if the detected level is high, no occurrence of a framing error is detected (white circle in FIG. 4) and if the detected level is low, occurrence of a framing error is detected (black circle in FIG. 4).

Here, a transmission speed of the transmitting device 10 is 10/T1[bps]. Also, a transmission speed of the transmitting device 10 to be measured by the receiving device 20 can be expressed by a following expression:

$$10/(T2\times(A+B)) \text{ [bps]}$$

where "A" denotes the number of measuring points obtained when occurrence of a framing error is detected and "B" denotes the number of measuring points obtained when no occurrence of a framing error is detected. ("A" and "B" correspond to framing error detection information). The receiving device 20 can recognize a transmission speed of the transmitting device 10 by using the above expression (Moreover, T1=T2×(A+B)). The receiving device 20, after completion of the calculation of a transmission speed, sets the calculated transmission speed to the receiving device 20 and carries out communication with the transmitting device. However, if the measuring point interval T2 for the receiving device 20 is wider than the high-level time interval (T1/10) for the stop bit of the measuring data D1, there is a case in which the framing error detector 22 fails to detect that the stop bit is at a high level (that is, fails to scan) and, therefore, a condition for measuring a transmission speed is T2<T1/10. A maximum error is T2[s].

In general, a transmission speed of the transmitting device 10 is obtained from a following expression:

under the condition that T2<T1/n, $$n/(T2\times(A+B))$$

where "A" denotes the number of measuring points obtained when a level of measuring data in which its one frame is made up of "n" bits and its one frame time is "T1" is detected at every "n" detecting clocks and when occurrence of a framing error is detected, "B" denotes the number of measuring points obtained when a level of the measuring data is detected at every "n" detecting clocks and when no occurrence of a framing error is detected, and "T2" denotes measuring point interval time.

Moreover, in the above calculation, the transmission speed is measured in a unit of one frame of "A+B". However, the transmission speed can be calculated by using the number of measuring points "A" obtained when occurrence of a framing error is detected. That is, in the above example, the transmission speed is 9/(T2×A) [bps] (generally, (n−1)/(T2×A) [bps]).

Also, a format of the above measuring data D1 is limited to "Start bit (Low)+0x00+Stop bit (High)" (in order to clarify a stop bit). Furthermore, when a level of a stop bit contained in the measuring data D1 is to be detected, at least 2 pieces or more of continuous measuring data D1 should be transmitted (this is because, after the transmission of the data, since signals are fixed to be at a high level, it is impossible to recognize completion of the detection).

Figure 5:
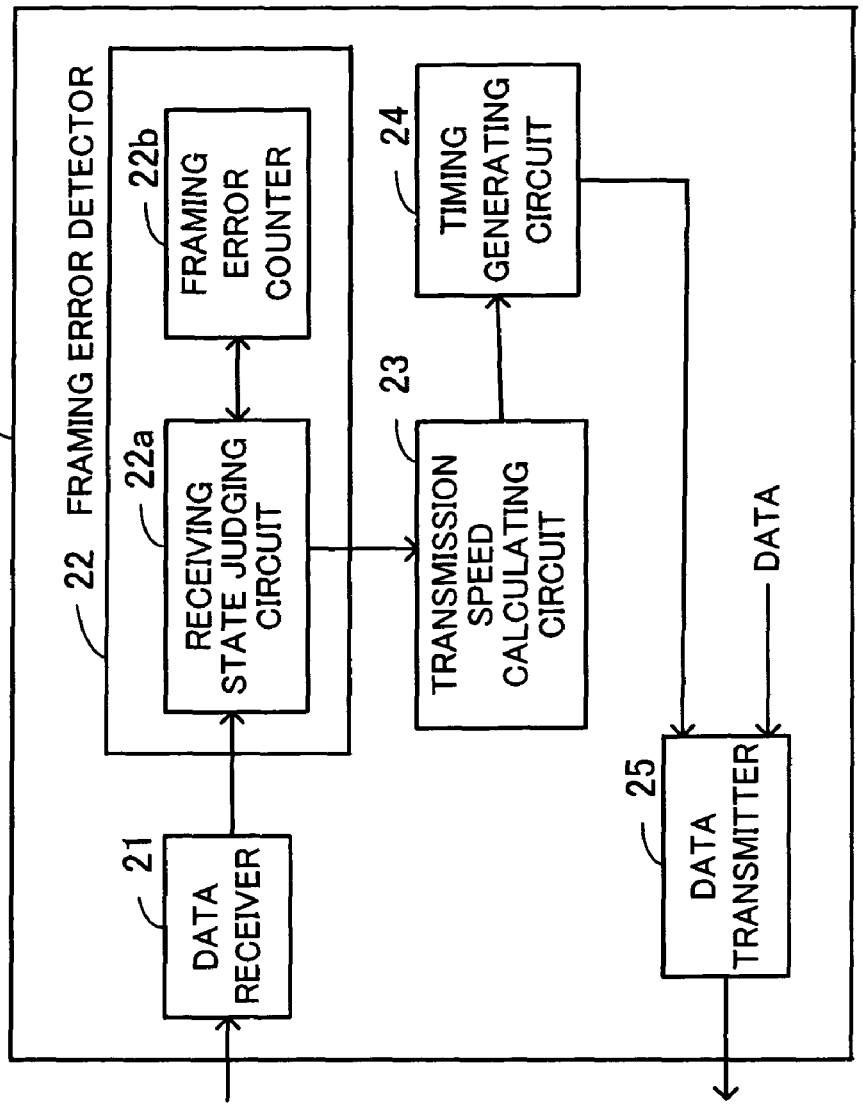
FIG. 5 shows configurations of the communication device employed in the present invention.

Next, configurations and operational flows of the communication device (receiving device) 20 of the present invention are described. FIG. 5 shows configurations of the communication device 20. The communication device 20 is made up of a data receiver 21, a framing error detector 22, a transmission speed calculating circuit (transmission speed measurer) 23, a timing generating circuit 24, and a data transmitter 25. The framing error detector 22 has a receiving state judging circuit 22a and a framing error counter 22b.

The data receiver 21 receives measuring data D1 from the transmitting device 10 before setting of a transmission speed and normal data after setting of the transmission speed. The receiving state judging circuit 22a detects a framing error of the measuring data D1. The framing counter 22b counts the number of times of detection and non-detection of a framing error. The transmission speed calculating circuit 23 calculates a transmission speed based on a count value and counting interval time. The timing generating circuit 24 sets the calculated transmission speed to the timing generating circuit 24 itself. The data transmitter 25 transfers data to the transmitting device 10 with transmitting timing set by the timing generating circuit 24.

Figure 6:
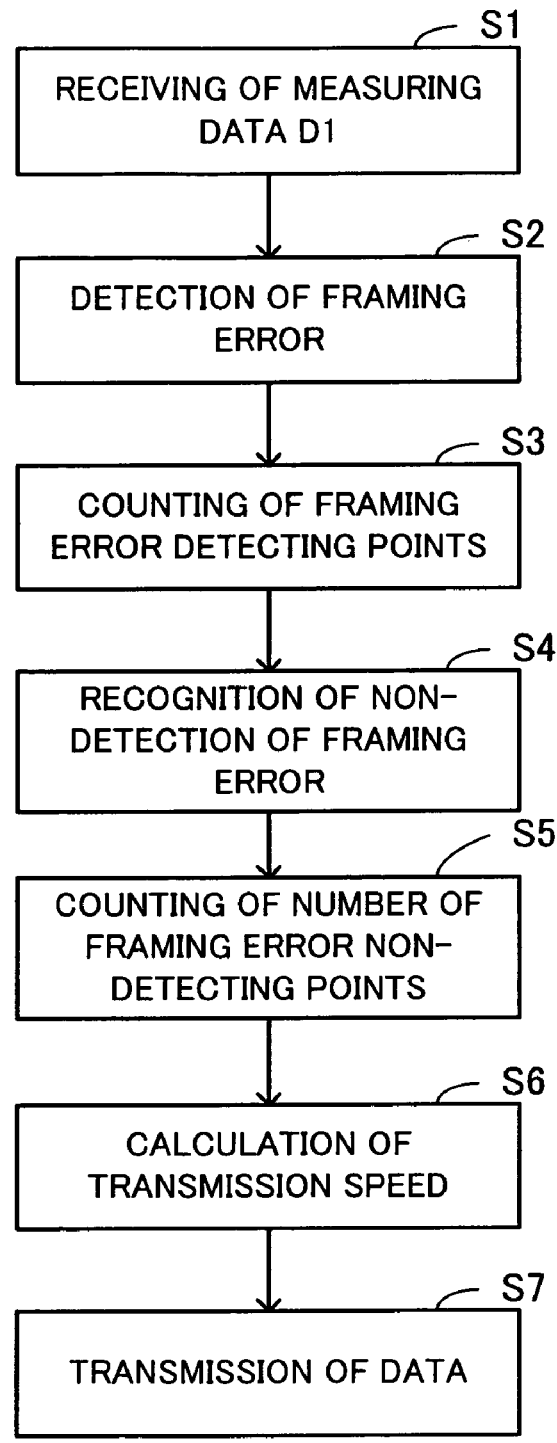
FIG. 6 shows a diagram showing an operational flow chart of the communication device employed in the present invention.
Figure 7:
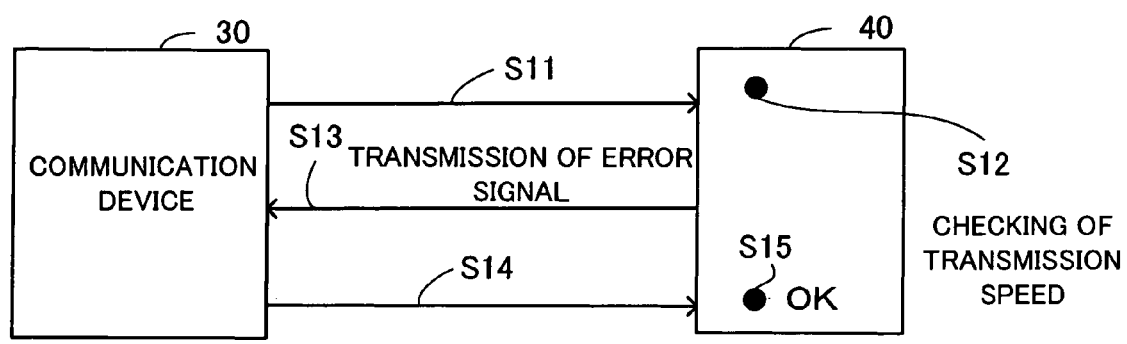
FIG. 7 shows a conventional method for setting a transmission speed.

FIG. 6 shows a diagram showing an operational flow chart of the communication device 20 employed in the present invention.

(Step S1). The data receiver 21 receives measuring data D1 from the transmitting device 10.

(Step S2) The receiving state judging circuit 22a detects a framing error.

(Step S3) The framing error counter 22b counts the number of framing error detecting points.

(Step S4) The receiving state judging circuit 22a recognizes non-detection of occurrence of a framing error.

(Step 5) The framing error counter 22b counts the number of framing error non-detecting points.

(Step S6) The transmission speed calculating circuit 23 calculates a transmission speed of the transmitting device 10 based on a count value and counting interval time.

(Step S7) The timing generating circuit 24 generates timing of the timing generating circuit 24 itself based on the calculated transmission speed and the data transmitter 25 transmits data with the set timing.

As described above, according to the present invention, when asynchronous communication is to be carried out between two communication devices, one communication device, by using a framing error, measures and calculates a transmission speed to be set to its self communication device so that a transmission speed of another communication device coincides with a transmission speed of the one communication device. This enables easy setting of a transmission speed between a signal transmitter and a signal receiver when information communication is carried out and also enables improvement of communication quality at time of an initial operation of asynchronous communication.

The communication system of the present invention is so configured that its transmitting device transmits one frame of measuring data which contains a start bit to be added to a head of the data and a stop bit to be added to an end of the data and which is used for a receiver to measure a transmission speed and its receiving device receives measuring data and detects occurrence of a framing error at every measuring point and measures a transmission speed of a transmitting device based on framing error detecting information and measuring point interval time. This enables easy setting of a transmission speed between a signal transmitter and a signal receiver when information communication is carried out.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for carrying out communication by setting a transmission speed, comprising:

a transmitting device to transmit one frame of measuring data which contains a start bit to be added to a head of the data and a stop bit to be added to an end of the data and which is used for a signal receiver to measure a transmission speed; and a receiving device having a framing error detector to receive the measuring data for detection of a framing error which occurs when a transmission speed of a signal transmitter does not coincide with a transmission speed of said signal receiver and normal detection of a stop bit is impossible and to generate information about detection of a framing error and having a transmission speed measurer to measure a transmission speed of said transmitting device based on information about detection of a framing error, wherein the framing error detector is configured to detect at every detecting point and to count a first number of framing error detection points and a second number of framing non-error detection points, wherein a transmission speed is measured based on a measuring point interval time, the first number and the second number.

2. The communication system according to claim 1, wherein said framing error detector detects a level of measuring data in which one frame is made up of n-bits, wherein n is a natural number greater than zero, and one frame time is "T1" at a measuring interval at every n-detecting clocks and said transmission speed measurer calculates, when T2<T1/n, a transmission speed of said transmitting device from an expression "n/(T2×(A+B))" where "A" is the first number, "B" is the second number, and "T2" is framing detecting information which denotes measuring point interval time.

3. A communication device for carrying out communication by setting a transmission speed, comprising:

a data receiver receiving one frame of measuring data which contains a start bit to be added to a head of the data and a stop bit to be added to an end of the data and which is used to measure a transmission speed and receiving data following the stop bit and having a state different from a state of the stop bit;

a framing error detector to receive the measuring data for detection of a framing error which occurs when a transmission speed of a signal transmitter does not coincide with a transmission speed of a signal receiver and normal detection of a stop bit is impossible and to generate information about detection of a framing error; and a transmission speed measurer to measure a transmission speed of said transmitting device based on information about the detection of a framing error, wherein the framing error detector is configured to detect at every detecting point and to count a first number of framing error detection points and a second number of framing non-error detection points, wherein a transmission speed is measured based on a measuring point interval time, the first number and the second number.

4. The communication device according to claim 3, wherein said framing error detector detects a level of measuring data in which one frame is made up of n-bits, wherein n is a natural number greater than zero, and one frame time is "T1" at a measuring interval at every n-detecting clocks and said transmission speed measurer calculates, when T2<T1/n, a transmission speed of said transmitting device from an expression "n/(T2×(A+B))" where "A" is the first number, "B" is the second number, and "T2" is framing detecting information which denotes measuring point interval time.

5. A transmission speed setting method for automatically setting a transmission speed between a signal transmitter and a signal receiver, said method comprising the steps of:

making a transmitting device transmit one frame of measuring data which contains a start bit to be added to a head of the data and a stop bit to be added to an end of the data and which is used for a signal receiver to measure a transmission speed;

making a receiving device detect a level of measuring data in which one frame is made up of n-bits, wherein n is natural number greater than zero, and one frame time is "T1" at a measuring interval at every n-detecting clocks when receiving the measuring data and detecting, at every detecting point of a framing error which occurs when a transmission speed of a signal transmitter does not coincide with a transmission speed of a signal receiver and normal detection of a stop bit is impossible;

calculating, when T2<T1/n, a transmission speed of said transmitting device from an expression "n/(T2+(A+B))" where "A" denotes the number of measuring points at time of the detection of a framing error, "B" denotes the number of measuring points at time of non-detection of a framing error, and "T2" denotes measuring point interval time.

* * * * *